W. FETZER.
DISK HARROW.
APPLICATION FILED DEC. 29, 1911.

1,281,324.

Patented Oct. 15, 1918.
3 SHEETS—SHEET 1.

UNITED STATES PATENT OFFICE.

WILLIAM FETZER, OF SPRINGFIELD, ILLINOIS.

DISK HARROW.

1,281,324.

Specification of Letters Patent.   Patented Oct. 15, 1918.

Application filed December 29, 1911.   Serial No. 668,536.

*To all whom it may concern:*

Be it known that I, WILLIAM FETZER, citizen of the United States, residing at Springfield, in the county of Sangamon and State of Illinois, have invented certain new and useful Improvements in Disk Harrows, of which the following is a specification, reference being had therein to the accompanying drawings.

This invention relates to an improvement in disk harrows.

In disk harrows, four harrow sections have been used, such section being arranged in two pairs, one behind the other, and means have been conveniently provided for angular horizontal adjustment of the sections of each pair.

Modern practice has recognized the advantages of double disking the ground, that is to say, first disking the ground in one way and then disking it in the opposite way. This practice is quite generally followed at the present time. Although several machines have been exploited which purport to successfully enable the accomplishment of this result, they have never proven generally satisfactory, and hence the general practice at this time is to use two machines disking one way and then to cross or reverse the work. Necessarily such a course is expensive and one of the primary objects of the present invention is the provision of a strong and durable harrow of such a construction as will render it possible to properly double disk the ground with a single machine.

A further object of the invention is to provide a disk harrow for double disking the ground by throwing the dirt in one direction with the front disks and then redisking the dirt by throwing it back again in substantially the opposite direction with the rear disks, the rearward disks being positioned to work between the paths cut by the forward disks and being held at all times in substantially a horizontal position, thus enabling the proper disking and leveling of the entire surface of the ground.

A further object of the present invention is the provision of a disk harrow of this type which is provided with a rigid frame adapted to support the driver and which is so disposed relatively to the harrow sections as to distribute the weight of the frame and driver upon all of such sections.

A further object of the present invention is the provision in a harrow of this character, of a main frame which is so connected to all of the harrow sections as to equally distribute the weight of the frame and the driver thereto in combination with means for connecting the harrow sections to the main frame in such a manner as to permit the machine to operate efficiently on rough as well as on level ground.

A further object of the invention is the provision in a harrow of this character, of a pair of forward harrow sections which are so supported on the frame as to be capable of a limited vertical movement, thus enabling such sections to work into rough or uneven ground, in combination with a pair of rear harrow sections which are so supported on the frame as to be held against substantial movement in a vertical plane so that the rearward harrow sections will level off the surface of the soil pulverized by the forward sections.

A further object of the invention is the provision of a harrow of this character in which the main draft or pull is from axles of the several harrow sections and so relieving the frame.

A further object of the invention is the provision of a harrow of this character which can be readily transported from place to place when not in use.

Other objects of the invention will be apparent from the detailed description hereinafter, when read in connection with the accompanying drawings forming a part hereof, wherein a convenient embodiment of the invention is illustrated and wherein like characters of reference refer to similar parts in the several views:

In the drawings:

Fig. 6 is a detail view showing the construction of one of the trucks which are used when it is desired to transport the machine from place to place.

Fig. 7 is a detail plan view of one of the bearing blocks at the end of one of the cross beams of the frame.

Fig. 8 is a detail view of the connection between the hounds F, and the bearings $d$.

Figure 1:
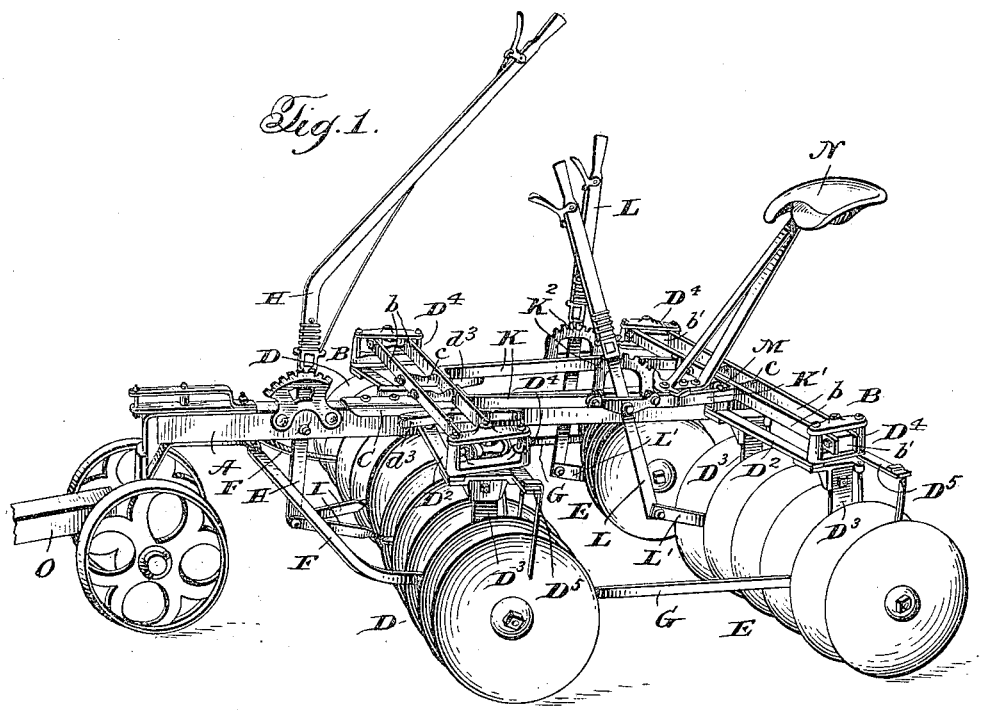
Figure 1 is a perspective view of a harrow constructed in accordance with the present invention.
Figure 2:
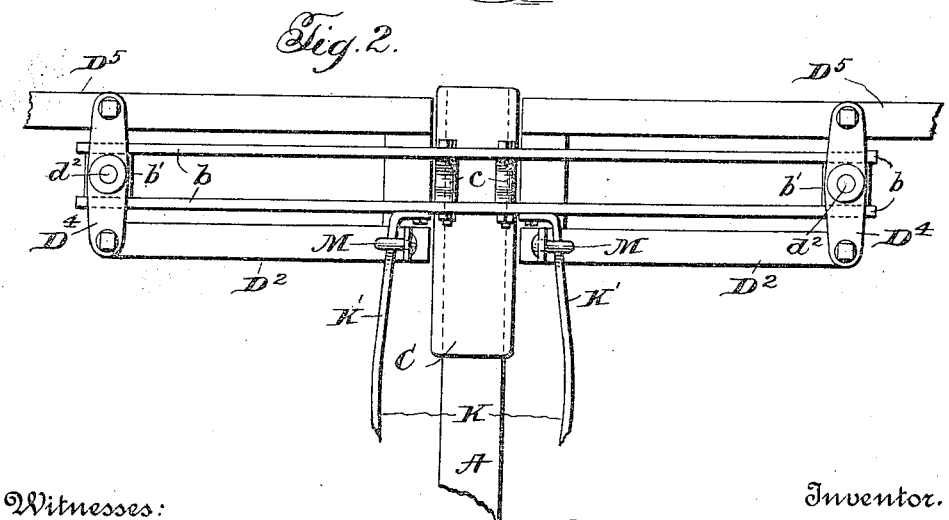
Fig. 2 is a fragmentary top plan view of the rear end of the harrow showing the rear cross beam and the manner of attaching the rear harrow sections thereto.
Figure 3:
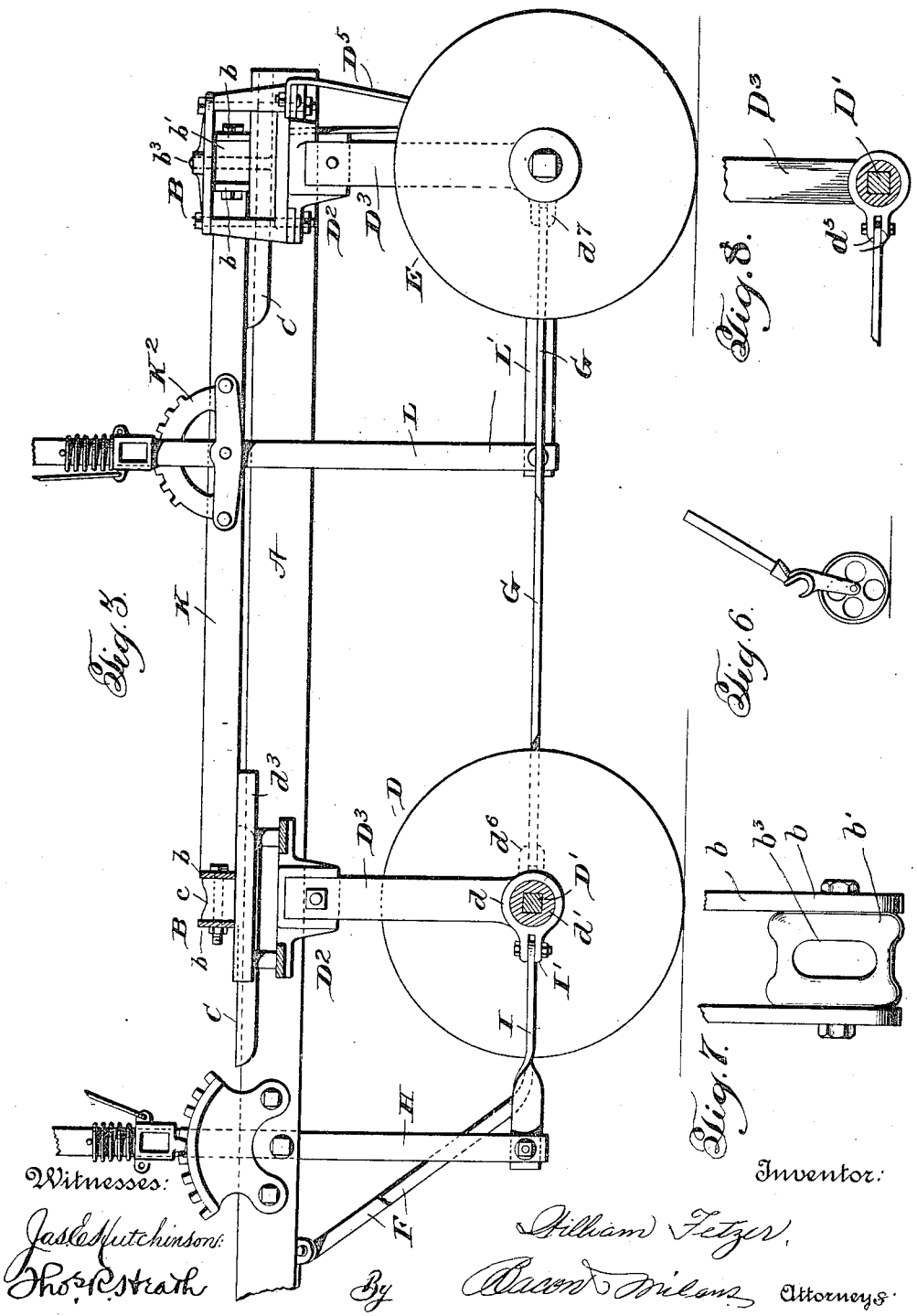
Fig. 3 is a side elevation of the harrow, parts being broken away and parts being shown in section.
Figure 4:
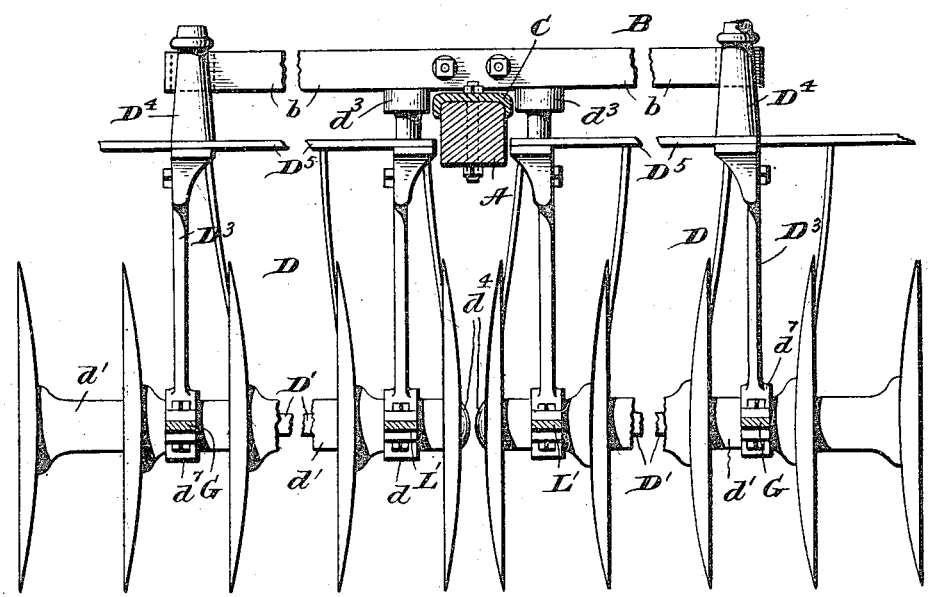
Fig. 4 is a cross section through the longitudinal beam of the harrow just in front of the rear harrow sections, such rear harrow sections being shown in elevation.
Figure 5:
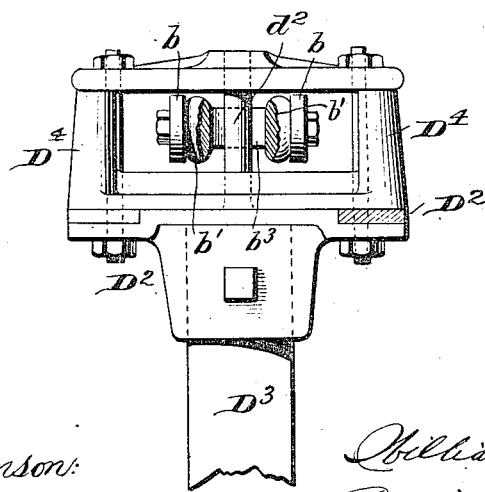
Fig. 5 is a fragmentary end elevation of one of the harrow sections showing the manner of connecting the same to the main frame.

Referring now more particularly to the drawings the machine is provided with a rigid frame which overlies the harrow sections and comprises a longitudinally extending beam A and a pair of separated parallel cross beams B B, which are rigidly secured to the longitudinally disposed beam A intermediate the ends thereof. The cross beams B B, one of which is secured to the longitudinal beam A adjacent the rear end thereof, and the other of which is secured to the longitudinal beam A at some distance from the front end thereof, may be of any desired construction. In the form of the invention illustrated in the drawings, each of said cross beams comprises a pair of spaced steel bars $b\ b$ between the outer ends of which are bolted or otherwise rigidly secured blocks $b'$ for a purpose to be hereinafter more particularly set forth. Any suitable means may be employed for rigidly securing the cross beams to the longitudinal beam A, and in the form of the invention illustrated in the drawings, suitable castings C C are rigidly secured to the beam A for this purpose, which castings are provided with portions $c\ c$ which project upwardly therefrom and fit between the side bars of the cross beams B B and are bolted or otherwise rigidly secured thereto. Supported by the front cross beam B are a pair of transversely disposed disk harrow sections D D and supported by the rear cross beam are a pair of transversely disposed harrow sections E E. Each of the harrow sections just referred to comprises an axle $D'$ upon which is mounted the disks which may be of any well known construction, and a frame $D^2$ which directly overlies the axle and is provided with rigid supports $D^3$ depending from the ends thereof, the lower ends of which supports are provided with suitable bearings $d$ which loosely embrace spools $d'$ mounted on the axle of the harrow section. The disks of the forward harrow sections are preferably mounted on the axles of such sections with the concave faces thereof outside, while the disks of the rear sections are preferably secured on the axles of said sections with their convex faces outside and the relative arrangement of the several sections is such that the disks of the rear sections will work in paths intermediate the disks of the front sections. The frame $D^2$ of each of the harrow sections is provided at the outer end thereof with a yoke $D^4$ which is of a size to embrace the outer end of one of the cross beams B B. The yokes $D^4$ of the frames $D^2$ of the front harrow sections D D engage the ends of the front cross beam B and are secured thereto by bolts $d^2$ which pass through the yokes and slots $b^3$ formed in the blocks $b'$ which are secured to the outer ends of said front cross beam. The slots $b^3$ extend longitudinally of the cross beam B and the size of the bolts $d^2$ and the slots $b^3$ are so proportioned relative to each other that sufficient play is allowed between the parts to permit the front harrow sections to turn freely on the bolt $d^2$ horizontally, and to have a limited pivotal movement on the bolt $d^2$ in a transverse vertical plane.

This construction also permits the front harrow sections to have a limited endwise movement or to shift bodily transversely of the frame, so that in action the adjacent ends of the front sections will bump or roll together, thus relieving the end thrust or strains caused by the two front harrow sections having the disks thereof supported with their concave faces outside. To prevent wear on the adjacent disks of the front sections, by reason of such bumping or rolling, the ends of the axles are provided with convex bumpers or washers $d^4$ which overlie the adjacent faces of the innermost disks.

The front harrow sections are free to move vertically only in a downward direction, the inner ends of the frames of said sections being provided with segmental plates $d^3$ which directly underlie the front cross bar B of the main frame, thus preventing the inner ends of the front sections from moving upwardly beyond their normal positions. The yokes $d^4$ of the frames of the rear harrow sections fit over the ends of the rear cross beams B and are connected thereto by bolts $b^3$ formed in the blocks $b'$ secured in the ends of such rear cross beam, such construction permitting the rear section to be swung laterally in a horizontal plane.

Each of the frames $D^2$ of the harrow sections is provided with a transversely disposed scraper supporting bar $D^5$ which extends transversely of the harrow sections and from which depend a plurality of disk scrapers, which may be of any suitable construction, there being one such scraper for each of the disks.

The outer portions of the forward disk sections are connected to the forward portion of the longitudinally extending beam A of the frame, by hounds F F, the forward ends of such hounds being pivotally connected in any suitable manner to the beam A adjacent the front end thereof and the rear ends of such hounds being pivotally connected in any suitable manner in the axles of the forward harrow sections adjacent the outer ends thereof. As a convenient method of connecting the rear ends of such hounds to the harrow sections, the bearings $d$ at the lower ends of the supports $D^3$ depending from the outer ends of the frames $D^2$ of the forward harrow sections are provided each with a pair of horizontally disposed spaced ears $d^5$ between which the rear ends of the hounds F F are pivotally supported. The outer ends of the front harrow sections are also connected to the outer ends of the rear harrow sections by means of hounds G G the forward ends of which are pivotally connected in any suitable manner to the axles of the front harrow sections and the rear ends of which are pivotally connected in any suitable manner to the axles of the harrow sections. The forward ends of the hounds G G are conveniently pivoted between horizontally disposed ears $d^6$ which project laterally from the rear of the bearings $d$ formed at the end of the rigid support $D^3$ depending from the outer ends of the frames $D^2$ of the front harrow sections, while the rear ends of such hounds are conveniently pivoted between similarly formed ears $d^7$ which project forwardly from the bearings $d$ formed at the lower ends of the rigid standards $D^3$ depending from the outer ends of the frames $D^2$ of the rear harrow sections.

Pivotally supported upon the longitudinally disposed beam A between the front cross beam B and the front end of said longitudinal beam, is an upstanding lever H, the lower end of which extends below the longitudinal beam A and is connected by suitable links I I to the inner ends of the axles of the forward harrow sections D D. The forward ends of the links I I are pivotally connected to the lower end of the lever H in any suitable manner and the rear ends of said links are conveniently pivoted between horizontally disposed ears I' which project forward from the bearings $d$ at the lower ends of the rigid standards $D^3$ depending from the inner ends of the frames $D^2$ of the forward harrow sections D D. A suitable rack is provided on the beam A and the lever H is provided with a suitable pawl for engaging said rack so that the lever may be held in any desired position of adjustment. From the construction just described it will be seen that by manipulating the lever H the front harrow sections D D may be simultaneously set at any desired angle and held in this position, and that by reason of the employment of the links I I the freedom of the front harrow sections to adjust themselves vertically to any irregularities in the ground, is not in any way interfered with regardless of the positions to which they may be adjusted by the lever H.

The cross beams B B are connected at their central portions by suitable steel brace bars K K which are positioned one upon each side of the longitudinal beam A of the frame, the rear ends of said brace bars being inclined inwardly, as at K', toward the longitudinal beam A of the machine, for a purpose to be hereinafter more particularly set forth. Pivotally supported upon the brace bars K K are a pair of upstanding levers L L the lower ends of which project below said brace bars. Links L' pivotally connect the lower ends of the levers L L with the inner ends of the axles of the rear harrow sections E E the rear ends of said links being conveniently pivoted between horizontally disposed ears which project forwardly from the bearings $d$ at the lower ends of the rigid supports $D^3$ depending from the inner ends of the frames $D^2$ of the rear harrow sections E E. Each of the brace bars K K is provided with a segmental rack $K^2$ and each of the levers L L is provided with a detent which is adapted to coöperate with one of said racks, so that the levers may be maintained in any desired position of adjustment. From this construction it will be seen that by means of the levers L L the rear harrow sections may be set at any desired angle and that such sections may be adjusted independently of each other.

Projecting upwardly from the inner ends of the frames $D^2$ of the rear harrow sections E E are hook members M M which are adapted to rest upon the upper edges of the rearwardly inclined portions K' of the brace bars K K and the inclination of the portions K' of said brace bars is such that the hook members M M will always rest upon said brace bars regardless of the position to which the rear harrow sections may be adjusted by the levers L L. It will be seen from this construction that the rear harrow sections are freely movable in a horizontal plane thus enabling them to be set at any desired angle, but that they are held against movement in a vertical plane. This is an important feature of the invention as while the front harrow sections are mounted so that they can move freely in a vertical plane, thus enabling them to conform to the surface of the ground, the rear harrow sections are held against any such movement, in a vertical plane which insures the leveling of the soil which has already been pulverized by the front harrow sections. Supported upon the longitudinal beam A of the frame is a seat N for the operator which may be of any well known construction and from which the levers H and L L are readily accessible.

Secured to the front end of the longitudinal beam A of the machine is a tongue truck O from which extends the usual tongue.

From the construction hereinbefore set forth it will be seen that by reason of the employment of the rigid frame, the cross beams of which directly overlie the harrow sections, the weight of the operator is distributed evenly to all of said sections and that by reason of the manner of connecting the sections to the rigid frame, the harrow will work with equal facility in rough or level ground.

It will also be apparent from the construction hereinbefore set forth that the harrow will be particularly efficient for "double disking" the ground in a satisfactory manner, since the front sections are so constructed that they will pulverize the uneven surface of the ground and throw the soil in one direction, while the disks of the rear sections working between the disks of the front sections will repulverize the soil and throw it back in the opposite direction and will by reason of the manner of supporting the rear sections, properly level the soil thus pulverized.

By reason of the employment of the rigid frame and the particularly constructed harrow sections associated therewith, I have produced a four-section harrow which can be readily transported from place to place by the use of harrow transport trucks such as are illustrated in Fig. 6 of the drawings. When it is desired to transport the harrow from place to place, the rear sections are locked in alinement by means of the levers L L and one of the truck attachments such as is shown in Fig. 6 of the drawings, is secured to the axle of each of the rear harrow sections. The truck attachment itself forms no part of the present invention but constitutes the subject matter of my Patent No. 843,671, and I have therefore deemed it unnecessary to describe the same in detail.

While a convenient embodiment of the invention is illustrated in the accompanying drawings, it will be understood that many changes may be made to the form and construction therein shown without departing from the spirit and scope of the invention as defined in the appended claims.

I claim:—

1. In a harrow, a pair of front harrow sections, a pair of rear harrow sections, a rigid frame, means for flexibly connecting the front harrow sections to the frame to permit of a limited pivotal movement thereof in vertical planes, means for holding the rear harrow sections against pivotal movement in vertical planes, and a tongue truck supported by the frame in advance of the front pair of harrow sections.

2. In a harrow, a pair of front harrow sections, a pair of rear harrow sections, each of said sections comprising a frame, a disk carrying axle supported thereby and positioned therebeneath, a main frame comprising a logitudinally extending beam and a pair of spaced cross beams rigidly secured thereto, means for flexibly connecting the front harrow sections at their outer ends to the outer ends of the front cross beams to permit of a limited pivotal movement thereof in vertical planes, means for connecting the rear harrow sections to the rear cross beams and for holding the rear harrow sections fixed to the frame against vertical tilting movement, and a tongue truck supported by the main frame in advance of the front pair of harrow sections.

3. In a harrow, a pair of front harrow sections, a pair of rear harrow sections, each of said sections comprising a frame and a disk carrying axle positioned directly therebeneath, a rigid main frame for the frames of all of said harrow sections, means for pivotally connecting the outer ends of the frames of said harrow sections above the disk carrying axles thereof to said main rigid frame, hounds extending from the forward portion of the main frame to the outer ends of the axles of the front harrow sections, hounds connecting the outer ends of the front and rear harrow sections, a lever pivotally supported in said main frame in front of the pair of front harrow sections, the lower end of said lever extending below said main frame, links extending from the lower end of said lever to the inner ends of the axles of the front harrow sections, and adjustable connections between the main rigid frame and the inner ends of the axles of the rear harrow sections.

4. In a harrow, a pair of front harrow sections, a pair of rear harrow sections, each of said sections comprising a frame, and a disk carrying axle supported thereby and positioned directly therebeneath, a rigid main frame overlying the frame of all of said harrow sections, means for pivotally connecting the outer ends of the frames of said harrow sections above the disk carrying axles thereof to said main rigid frame, hounds extending from the forward portion of the main frame, to the outer ends of the axles of the front harrow sections, hounds connecting the outer ends of the front and rear harrow sections, a lever pivotally supported in said main frame in front of the pair of front harrow sections, the lower end of said lever extending below said main frame, links extending from the lower end of said lever to the inner ends of the axles of the front harrow sections, a pair of levers pivotally mounted in said main frame in advance of the rear harrow sections, and links connecting said levers with the inner ends of the axles of said rear harrow sections.

5. In a harrow, a pair of front harrow sections, a pair of rear harrow sections, each of said harrow sections comprising a frame and a disk carrying axle supported thereby and positioned therebeneath, a rigid main frame for the frames of all of said harrow sections, means for pivotally connecting the outer ends of the frames of said front pair of harrow sections to the main frame whereby the front harrow sections may be swung laterally and the inner ends thereof are free to move downwardly, means for pivotally connecting the outer ends of the frames of the rear harrow sections to said rigid main frame, to permit lateral adjustment thereof, means for holding the inner ends of the frames of the rear harrow sections against downward movement, draft connections extending forwardly from the main frame to the inner and outer ends of the axles of the frames of all of said harrow sections, the draft connections extending to the inner ends of said axles being adjustable to permit the harrow sections to be adjusted laterally on their pivots.

6. In a harrow, a pair of front harrow sections, a pair of rear harrow sections, each of said sections comprising a frame and a disk carrying axle supported thereby and positioned therebeneath, a rigid main frame overlying the frames of all of said harrow sections, means for pivotally connecting the outer ends of the frames of said front pair of harrow sections to the main frame, whereby the front harrow sections may be swung laterally and the inner ends thereof are free to move downwardly, means for pivotally connecting the outer ends of the frames of the rear harrow sections to said rigid main frame to permit lateral adjustment thereof, means for holding the inner ends of the frames of the rear harrow sections against downward movement, hounds extending from the forward portion of the main frame to the outer ends of the axles of the front harrow sections, a pair of connecting the outer ends of the axles of the front harrow sections to the outer ends of the axles of the rear harrow sections, a lever pivoted in the main frame in advance of the pair of front harrow sections, links extending from said lever to the inner ends of the axles of the front harrow sections, a pair of levers pivoted in the main frame in advance of the rear harrow sections, and links extending from said levers to the inner ends of the axles of the rear harrow sections.

7. In a harrow, a frame comprising a longitudinally extending beam, and a pair of spaced cross beams rigidly secured to said longitudinally extending beam intermediate their ends, brace bars connecting said cross beams and positioned one on each side of said longitudinally extending beam, a pair of front harrow sections underlying the projecting portions of the front cross beam and pivotally connected thereto, whereby said frames have a limited movement in a vertical plane, a pair of rear harrow sections underlying the rear cross beam, each of said rear harrow sections comprising a frame, and a disk carrying axle supported thereby, means for pivotally connecting the outer ends of the frames of the rear harrow sections to the rear cross beams, hook members extending from the inner ends of the frames of the rear harrow sections and overlying the brace bars connecting the cross beams to the main frame, and means carried by the main frame for adjusting the iner ends of the rear harrow sections laterally.

8. In a harrow, a frame comprising a longitudinally extending beam, and a pair of spaced cross beams rigidly secured to said longitudinally extending beam intermediate their ends, brace bars connecting said cross beams and positioned one on each side of said longitudinally extending beam, a pair of front harrow sections underlying the projecting portions of the front cross beam and pivotally connected thereto, whereby said frames have a limited movement in a vertical plane, a pair of rear harrow sections underlying the rear cross beam, each of said rear harrow sections comprising a frame, and a disk carrying axle supported thereby, means for pivotally connecting the outer ends of the frames of the rear harrow sections to the rear cross beams, hook members extending from the inner ends of the frames of the rear harrow sections and overlying the brace bars connecting the cross beams to the main frame, a pair of levers fulcrumed intermediate their ends upon the brace bars connecting the cross beams to the main frame, and links extending from the lower ends of said levers to the inner ends of the axles of the rear harrow sections.

9. In a harrow, a pair of front harrow sections, a pair of rear harrow sections, a rigid frame for all of said harrow sections, means for flexibly connecting the front harrow sections to the frame, said flexible connections permitting the front harrow sections to swing laterally and to move in a vertical plane, means for pivotally connecting the rear harrow sections to the frame whereby they can be swung laterally, means for holding the rear harrow sections against pivotal movement in vertical planes, means for angularly adjusting the harrow sections, and a tongue truck supporting the frame in advance of the front pair of harrow sections.

In testimony whereof I affix my signature in presence of two witnesses.

WILLIAM FETZER.

Witnesses:
 W. H. WISTON,
 J. S. CALDWELL.

Copies of this patent may be obtained for five cents each, by addressing the "Commissioner of Patents, Washington, D. C."